(12) United States Patent
Rohrbach

(10) Patent No.: US 7,543,154 B2
(45) Date of Patent: Jun. 2, 2009

(54) METHOD AND DEVICE FOR DETERMINING AN ACCESS CODE

(75) Inventor: Reinhold Rohrbach, Bremerhaven (DE)

(73) Assignee: Patev GmbH & Co., KG, Munich (DE)

( * ) Notice: Subject to any disclaimer, the term of this patent is extended or adjusted under 35 U.S.C. 154(b) by 692 days.

(21) Appl. No.: 10/381,863

(22) PCT Filed: Sep. 26, 2001

(86) PCT No.: PCT/EP01/11130

§ 371 (c)(1),
(2), (4) Date: Oct. 31, 2003

(87) PCT Pub. No.: WO02/27442

PCT Pub. Date: Apr. 4, 2002

(65) Prior Publication Data

US 2004/0117633 A1    Jun. 17, 2004

(30) Foreign Application Priority Data

Sep. 29, 2000  (DE)  ............................. 100 48 334
Oct. 13, 2000  (DE)  ............................. 100 50 734

(51) Int. Cl.
*G06F 7/04* (2006.01)
*H04L 9/32* (2006.01)
*G06F 17/30* (2006.01)

(52) U.S. Cl. ..................... 713/183; 726/16; 380/52; 380/54

(58) Field of Classification Search .......... 713/183; 726/16; 380/52, 54
See application file for complete search history.

(56) References Cited

U.S. PATENT DOCUMENTS 5,276,314 A * 1/1994 Martino et al. ............. 340/5.27
5,465,084 A   11/1995 Cottrell
6,332,192 B1 * 12/2001 Boroditsky et al. ......... 713/168

FOREIGN PATENT DOCUMENTS

| EP | 677801 A1 * | 10/1995 |
| GB | 2313460 A * | 11/1997 |
| WO | WO 96/18139 | 6/1996 |
| WO | WO 9852115 A1 * | 11/1998 |

OTHER PUBLICATIONS

Bensinger, David. Human Memory and the Graphical Password, 1998 Passlogix, Inc.*
Dhamija, Rachna et al. "Deja Vu: A User Study Using Images for Authentication", 1998.*

(Continued)

*Primary Examiner*—Michael J Simitoski
(74) *Attorney, Agent, or Firm*—Oliff & Berridge PLC

(57) ABSTRACT

A method for determining an access code comprising a predetermined number of input symbols. The access code is determined from input symbols and the position thereof when inputted. The number of possible input positions for the input symbols is greater than the predetermined number of input symbols. An input device detects the input symbols and the positions thereof in an input field. An access code is determined therefrom and compared in a comparator with a references access code. If compatibility is established, access to the system is authorized.

29 Claims, 3 Drawing Sheets

Example 1

Extended Presentation of Information Carrier

OTHER PUBLICATIONS

Jermyn, Ian et al. "The Design and Analysis of Graphical Passwords", Mar. 1999.*

Naor, Moni et al. "Visual Authentication and Identification".*

Sobrado, Leonardo et al. "Graphical passwords". The Rutgers Scholar, 2002.*

"Drawing Passwords", IBM Technical Disclosure Bulletin, Bd. 40, Nr. 5, May 1, 1997 (pp. 201-203).

* cited by examiner

Example 1

| 123 | ... | ... |
|-----|-----|-----|
| ... | ... | ... |
| ... | ... | ... |

Example 2

| .1.. | ... | ... |
|------|-----|-----|
| ..2  | ... | ... |
| ...  | ... | 3.. |

Example 3

| .M. | ... | ... |
|-----|-----|-----|
| U.1 | ..l | ... |
| ... | .e. | ..r |

Example 4

| .M.e. | ... | u.. |
|-------|-----|-----|
| ...   | ..l | ... |
| L..   | .e. | ..r |

Fig. 1

Example 1

Extended Presentation of Information Carrier

METHOD AND DEVICE FOR DETERMINING AN ACCESS CODE

FIELD OF THE INVENTION

The present invention relates to a method and an apparatus for the determination of an access code comprising a predetermined number of input symbols which particularly include code numbers, code words and code characters.

BACKGROUND OF THE INVENTION

In the past, in many security systems were encountered enormous deficiencies concerning the security of an access code. For example, many codes can be decoded through viruses or similar. Likewise, computer experts have developed programs for the decoding of codes. Standardized input methods of the code, e.g., at log-on windows, with credit cards etc., facilitate every hacker the developing of viruses and programs to decode diverse codes.

SUMMARY OF THE INVENTION

It is an object of the present invention to provide a user friendly method for determination of an access code.

The method for determination of an access code with a predetermined number of input symbols determines the access code from input symbols and their positions at input time. Thereby, the number of possible input positions of the input symbols is larger than the predetermined number of input symbols. Both, the input symbols and their respective positions in an input field are detected and taken into account for the determination of the access code.

This may be performed advantageously by the presentation of the login screen of a computer system. Instead of the password input at the log-in of a user, the presentation of the input field for the input symbols takes place. The user inputs the input symbols, e.g. numbers or characters, in input positions determined by the user. Thereby, he can use a scheme easily to remember, e.g. from top to bottom, diagonal, or crosswise. The method is particularly user friendly since the user has to remember only a few input symbols. Through the variety of the geometric arrangement of the input symbols, the security is increased without burdening the user with a huge number of input symbols to remember. However, it is more simple to remember geometrical arrangements.

The possible input positions of the input symbols can be arranged in the form of a matrix. Other arrangements of the input symbols in the input field are also possible.

The input symbols may be numbers, characters, text symbols, graphical symbols, figures and other representable symbols. These can be registered through the keypad of an input device, or selected by the user, e.g., by means of a pointing device or touch screen. These symbols, e.g., can be representations of chess figures or other symbol sets selected by the user. An access control especially for children, e.g., can use the representation of comic figures. The children place the selected comic figures in the input field to determine their access code. That is easier to remember than combinations of numbers with more than one digit. By repeating the placement of the selected comic figures, children can get access to, e.g., a telephone, a computer, a room, or a building.

The method is sufficiently secure through the diverse variation possibilities, so that it can be done without a separate user registration, for instance the input of the user name. The user log-in can be performed at the same time and in one step with the determination of the access code.

Additionally, the colour of the input symbols may be used for the determination of the access code. This further increases the variation possibilities and, hence, increases the security. The user can select the colours from a predetermined selection while inputting of input symbols, and assign them to the input symbols.

To increase the access security, the sequence of the input of the input symbols can be used for determination of the access code. Additional variation possibilities of the access codes result, thus increasing the security of the method.

Various input positions can be combined to cells and provided with a frame. This increases the clearness and facilitates the use through easier to remember input positions. The cell frames can be in form of simple geometrical figures, particularly rectangles, triangles or circles. The cell frames and/or the presentation of the data input into the cells can be coloured.

In addition to the input data, the user can change the form and/or colour of the cell frames during the input. This may take place, e.g., through selection of a predetermined list of possible colours and/or forms. In addition, the forms and/or colours of the cell frames can also be used for the determination of the access code. The characteristic cell features (colour, form and frame colour) thus represent another symbol for determination of the access code. Thus, further variation possibilities of the possible access code arise, and the security of the method increases.

The advantage of the method and the apparatus is to provide a user friendly and secure access control. The geometrical arrangement of the input symbols and the coloured arrangement as well as the cell frame form and colour of the cell frames are easier to remember by people than long rows of numbers and characters. Because of the resulting additional variation possibility, the number of the input symbols to be input can be reduced with constant security of the access control, or the security of the access control is clearly increased when the number of input symbols to be input is constant.

The scheme according to the present invention (e.g., the presentation of several geometrical or asymmetrical symbols, also interlaced with each other) is different from known methods for code input, and there is the possibility to achieve very high variation possibilities only by specifying a one-digit number, or a symbol, or a figure. By using a large number of numbers/symbols/figures, this can result in a great extent of variation possibilities for decoding, that this code is not as easy to decode as in the past.

Because of the variety of variation possibilities, the method according to the present invention can be used for many access controls, e.g., credit cards, cellular phones, machines, operating systems, software, hardware. The method can be used in form of a specific device or through integration into existing computer applications.

The method according to the present invention may be used, e.g., in systems for access control for rooms or buildings, nowadays frequently used. Thereby, a touch screen display at the outside of an entrance monitoring system is provided. The user now inputs on the touch screen display by the selection of positions and input symbols the necessary data for the method for determination of the access code according to the invention. On grounds of the variety of variation possibilities by the consideration of the input symbols positions, the input of only a few easy to remember input symbols is adequate for an effective and secure access control.

BRIEF DESCRIPTION OF THE DRAWINGS

FIG. 1 shows several examples for arrangement of input positions of the method according to the present invention.

DETAILED DESCRIPTION

The enclosed FIG. 1 shows several examples for arrangement of possible input positions of the method according to the present invention. In this embodiment three possible input positions are respectively combined to a cell, and the cells are arranged in a 3×3 matrix. During input of the input symbols, the cell frames can be changed by the user in form and/or colour, thereby representing another symbol to be used for the determination of the access code. This increases the variety of the possible codes, and allows the user an easy handling.

In a presented symbol for the cell frame (e.g. a square), it is possible to get a chance to input, e.g., by three input positions, in the symbol up to three input symbols, e.g., various numbers/symbols/figures (example 1). Because several symbols are to be presented for each of the presented symbols, there is the possibility to either input in a single cell an access code of three input symbols or to divide the three numbers/symbols/figures over the entire presented cells/symbols (example 2). In addition, all arranged cells or input symbols can be marked up in colour, which results in an additional increase of the selection possibilities for the input of a code.

While inputting a keyword, e.g., ones name, divided over the existing scheme, it should be almost impossible, even under the condition that it is the same name, to encounter exactly the symbols, the positions and the colours of the same name (FIG. 1, example 3+4).

Figure 2:
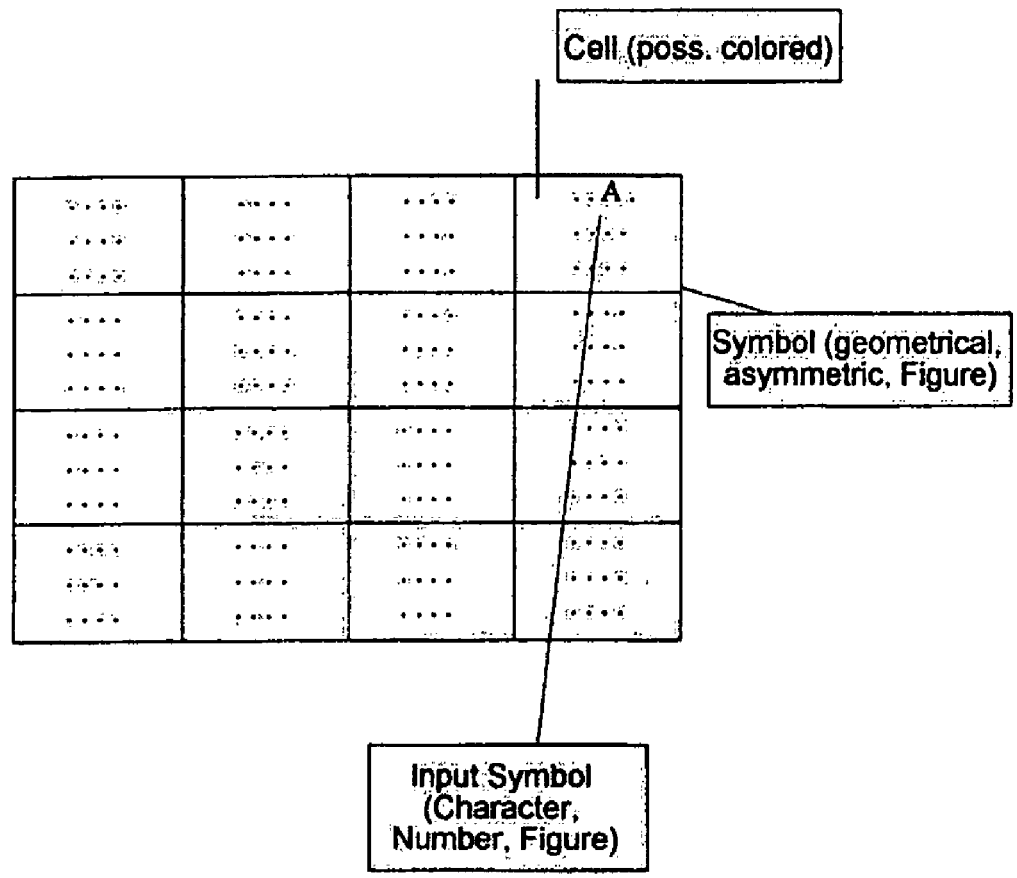
FIG. 2 shows another example for arrangement of input positions of the method according to the present invention.

Another example for arrangement of input positions of the method according to the present invention is shown in FIG. 2.

Figure 3:
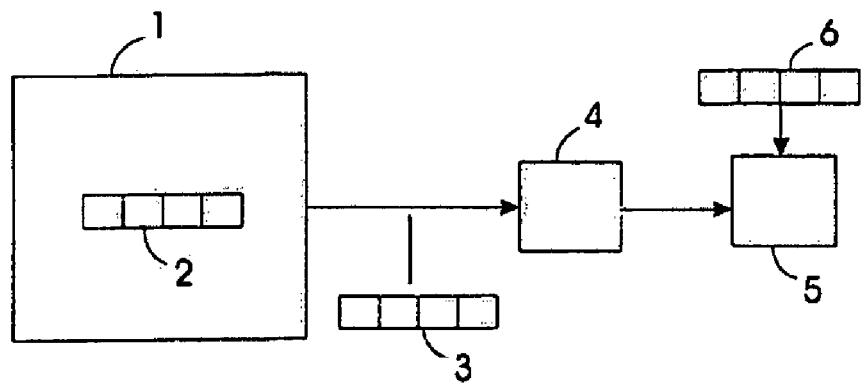
FIG. 3 shows a schematic block diagram for a conventional method for determination of an access code.

FIG. 3 shows a schematic block diagram for a method for determination of an access code. The detection device 1 presents the input positions for the, in this example, 4-digit access code in an input field 2. Conventionally, e.g., for registration of a PIN code for use at an automatic cash dispenser, the input positions for the input symbols are arranged linear next to each other. The 4-digit access code 3, e.g., input via a keypad, is usually subject to an encrypting method 4 for security increase. The encrypted access code is then checked for identity with a reference access code 6 in a comparator 5. Beforehand, the reference access code 6 is determined once and is thereby subjected to the same encrypting method. It can be stored, e.g., either on a magnetic card given to the user or within the access control system. If the comparator 5 determines an identity between the input and encrypted access code 3 and the reference access code 6, the access to the device to be secured is given.

Figure 4:
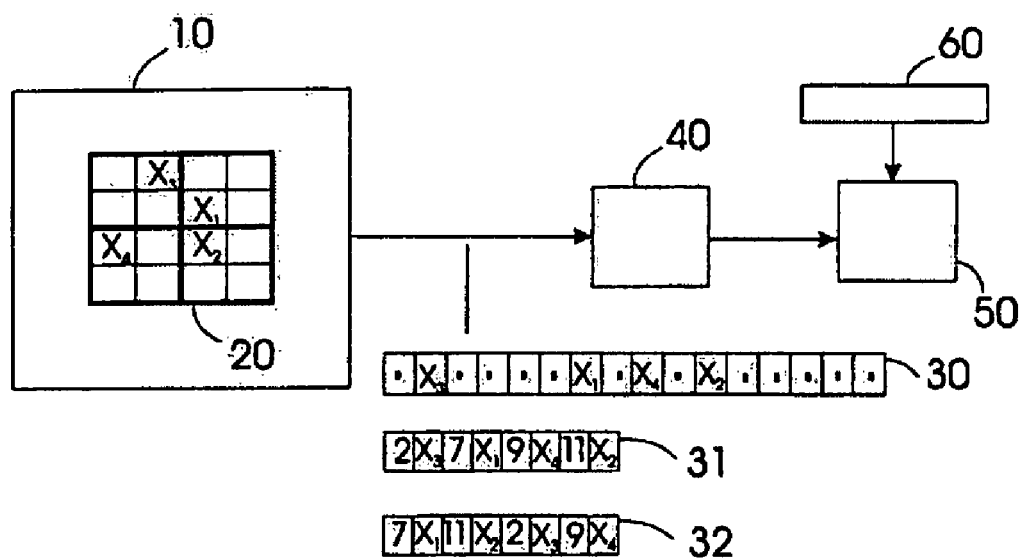
FIG. 4 shows a schematic block diagram of an embodiment of the method for determination of an access code according to the present invention.

FIG. 4 shows a schematic block diagram of an embodiment of the method according to the present invention. The detection device 10 presents the possible input positions for the input symbols in an input field 20. In this example, the possible input positions are arranged in a matrix form with four rows and four columns. Four input positions respectively next to each other may be combined to cells. The arrangement of the input positions in cells may increase the clearness and further improve the user friendliness of the method according to the present invention. In this example, likewise an access code comprising four input symbols is determined. The input positions selected by the user for input are marked with a cross. The detection device 10 detects the input input symbols and their respective positions in the input field 20. If necessary, the sequence of the inputs may also be detected. The detected data are now used for the determination of an access code.

A possible example for an access code determined from these input data is presented in field 30. Here the input positions of the input field 20 are linearized and unfilled fields are filled with a specific symbol. In this example, the input of four input symbols results in a 16-digit access code. It may be encrypted by means of an encrypting method 40 and compared with a reference access code 60 in a comparator 50. If the input access code 30 is identical to the reference access code 60, the access to the system is given.

In case of an equal number of input symbols, a very secure access code may be determined by the method according to the present invention. In the example for input of a 4-digit numerical PIN code, the number of possible access codes increases from 1000 for the known method (e.g., FIG. 3) to [16!/(16−4)!]*1000=43.680.000. Thereby, the user has additionally to remember only the arrangement of the input symbols in the input field.

For another possibility for the determination of the access code, the input positions of the input symbols, e.g., the position numbers of the selected fields, are used together with the input symbols directly for the determination of the access code. As in this example, the possible input fields may be simply numbered, or other methods may be applied, which use, e.g., the XY-coordinates of the input field and/or the coordinates within a cell.

Field 31 shows an access code determined by this method for the above mentioned example. The inputs were performed at positions 7, 11, 2, and 9. The four input symbols x1 to x4 each get their respective position numbers placed in front of them, and these pairs are entered into the access code in the sequence of the position numbers. The resulting 8-digit access code provides the same variation possibilities as the previous example, and allows a storing of the reference access code with saving of memory space.

Field 32 shows another possibility for the determination of an access code for the above mentioned example, for which the sequence of the inputs are taken into consideration. In the example, first x1 is input at position 7, then x2 is input at position 11, etc. The input symbols are entered into the access code together with their respective position in the sequence of their respective input. Thus, the number of the variation possibilities can additionally be increased, and the security of the access code can be further increased.

The above illustrated embodiments may be combined in every optional manner or reduced into stand-alone.

The invention claimed is:

1. A method for a computer determining an access code with a predetermined number of input symbols, comprising:

inputting the input symbols at a plurality of input positions in an input field that is at least two-dimensional, a number of the input positions being larger than the predetermined number of input symbols;

determining the access code from the input symbols, respective input positions at input of the input symbols, and an input sequence of input data;

arranging said input field as an at least two dimensional matrix of cells;
arranging a plurality of possible input positions in each of said cells; and
linearizing the input field to form a 1×N array that forms the access code, wherein:
the access code has a plurality of entries, each of the plurality of entries corresponding to each of the plurality of possible input positions irrespective of whether an input symbol has been input at each of the plurality of possible input positions; and
N is an integer greater than 1.

2. The method according to claim 1, further comprising:
arranging the plurality of input positions for the input symbols as a matrix.

3. The method according to claim 1, wherein:
the input symbols include at least one of numbers, characters, text symbols, graphical symbols, and figures.

4. The method according to claim 1, further comprising:
combining at least some of the input positions in the cells; and
providing the cells with respective frames.

5. The method according to claim 4, further comprising:
providing the frames as simple geometrical figures.

6. The method according to claim 5, wherein:
the simple geometrical figures include one of rectangles, triangles, and circles.

7. The method according to claim 4, wherein:
one of the cell frames and a presentation of the input data input into the cells are colored.

8. The method according to claim 4, wherein:
at least one of a form and a color of the frames is changeable during input.

9. The method according to claim 1, further comprising:
authenticating a user of a computer system using the access code.

10. The method according to claim 1, wherein at least a portion of the plurality of entries correspond to the location of each of the input symbols, and at least another portion of the plurality of entries correspond to each of the input symbols.

11. The method according to claim 10, wherein:
the access code is formed such that the order of the plurality of entries corresponds to the order that the input symbols appear on the input field after the input symbols have been input.

12. The method according to claim 10, wherein
the access code is formed such that the order of the plurality of entries corresponds to the order in which the input symbols were input to the input field.

13. A method for a computer determining an access code with a predetermined number of input symbols, comprising:
inputting the input symbols at a plurality of input positions in an input field that is at least two-dimensional, a number of the input positions being larger than the predetermined number of input symbols;
respectively arranging the plurality of input positions in cells;
determining the access code from the input symbols, respective positions at input of the input symbols, and an input sequence of input data;
determining the access code on the basis of a color of the input symbols; and
linearizing the input field to form a 1x N array that forms the access code, wherein:
the access code has a plurality of entries, each of the plurality of entries corresponding to each of the plurality of possible input positions irrespective of whether an input symbol has been input at each of the plurality of possible input positions; and
N is an integer greater than 1.

14. The method according to claim 13, wherein at least a portion of the plurality of entries correspond to the location of each of the input symbols, and at least another portion of the plurality of entries correspond to each of the input symbols.

15. The method according to claim 14, wherein:
the access code is formed such that the order of the plurality of entries corresponds to the order that the input symbols appear on the input field after the input symbols have been input.

16. The method according to claim 14, wherein
the access code is formed such that the order of the plurality of entries corresponds to the order in which the input symbols were input to the input field.

17. A method for a computer determining an access code with a predetermined number of input symbols, comprising:
inputting the input symbols at a plurality of input positions in an input field that is at least two-dimensional, a number of the input positions being larger than the predetermined number of input symbols;
respectively arranging the plurality of input positions in cells;
determining the access code from the input symbols, respective positions at input of the input symbols, and an input sequence of input data;
combining at least some of the input positions in the cells;
providing the cells with respective frames, wherein at least one of a form and a color of the frames is changeable during input;
determining the access code according to at least one of the form and the color of the frames; and
linearizing the input field to form a 1×N array that forms the access code, wherein:
the access code has a plurality of entries, each of the plurality of entries corresponding to each of the plurality of possible input positions irrespective of whether an input symbol has been input at each of the plurality of possible input positions; and
N is an integer greater than 1.

18. The method according to claim 17, wherein at least a portion of the plurality of entries correspond to the location of each of the input symbols, and at least another portion of the plurality of entries correspond to each of the input symbols.

19. The method according to claim 18, wherein:
the access code is formed such that the order of the plurality of entries corresponds to the order that the input symbols appear on the input field after the input symbols have been input.

20. The method according to claim 18, wherein
the access code is formed such that the order of the plurality of entries corresponds to the order in which the input symbols were input to the input field.

21. An apparatus for determining an access code with a predetermined number of input symbols, comprising:
an arrangement for inputting the input symbols at a plurality of input positions in an input field that is at least two-dimensional, a number of the input positions being larger than the predetermined number of input symbols;
an arrangement for determining the access code from the input symbols, respective input positions at input of the input symbols, and an input sequence of input data;
an arrangement for arranging said input field as an at least two dimensional matrix of cells, and for arranging a plurality of possible input positions in each of said cells; and an arrangement for linearizing the input field to form a 1xN array that corresponds to the access code, wherein:

the access code has a plurality of entries, each of the plurality of entries corresponding to each of the plurality of possible input positions irrespective of whether an input symbol has been input at each of the plurality of possible input positions; and N is an integer greater than 1.

22. The apparatus according to claim 21, further comprising:

an arrangement for controlling access to a computer system based on the access code.

23. The apparatus according to claim 21, wherein at least a portion of the plurality of entries correspond to the location of each of the input symbols, and at least another portion of the plurality of entries correspond to each of the input symbols.

24. The apparatus according to claim 23, wherein:

the access code is formed such that the order of the plurality of entries corresponds to the order that the input symbols appear on the input field after the input symbols have been input.

25. The apparatus according to claim 23, wherein the access code is formed such that the order of the plurality of entries corresponds to the order in which the input symbols were input to the input field.

26. An apparatus for determining an access code with a predetermined number of input symbols, comprising:

an arrangement for inputting the input symbols at a plurality of input positions in an input field that is at least two-dimensional, a number of the input positions being larger than the predetermined number of input symbols;

an arrangement for arranging a plurality of possible input positions in each of the cells;

an arrangement for determining the access code from the input symbols, respective positions at input of the input symbols, and an input sequence of input data, wherein the access code is determined based on a color of the input symbols; and an arrangement for linearizing the input field to form a 1xN array that corresponds to the access code, wherein:

the access code has a plurality of entries, each of the plurality of entries corresponding to each of the plurality of possible input positions irrespective of whether an input symbol has been input at each of the plurality of possible input positions; and N is an integer greater than 1.

27. The apparatus according to claim 26, wherein at least a portion of the plurality of entries correspond to the location of each of the input symbols, and at least another portion of the plurality of entries correspond to each of the input symbols.

28. The apparatus according to claim 27, wherein:

the access code is formed such that the order of the plurality of entries corresponds to the order that the input symbols appear on the input field after the input symbols have been input.

29. The apparatus according to claim 27, wherein the access code is formed such that the order of the plurality of entries corresponds to the order in which the input symbols were input to the input field.

* * * * *